United States Patent
Tsin et al.

(10) Patent No.: US 9,224,205 B2
(45) Date of Patent: Dec. 29, 2015

(54) ACCELERATED GEOMETRIC SHAPE DETECTION AND ACCURATE POSE TRACKING

(75) Inventors: Yanghai Tsin, San Diego, CA (US); Prasun Choudhury, San Diego, CA (US); Murali Ramaswamy Chari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 703 days.

(21) Appl. No.: 13/523,635

(22) Filed: Jun. 14, 2012

(65) Prior Publication Data
US 2013/0335575 A1   Dec. 19, 2013

(51) Int. Cl.
| G06K 9/46 | (2006.01) |
| H04N 5/228 | (2006.01) |
| G06T 7/00 | (2006.01) |
| G06T 7/20 | (2006.01) |

(52) U.S. Cl.
CPC ............. *G06T 7/0046* (2013.01); *G06T 7/2046* (2013.01); *G06T 2207/20061* (2013.01); *G06T 2207/20136* (2013.01); *G06T 2207/30204* (2013.01); *G06T 2207/30244* (2013.01)

(58) Field of Classification Search
None
See application file for complete search history.

(56) References Cited

U.S. PATENT DOCUMENTS

| 5,967,979 | A | 10/1999 | Taylor et al. | |
|---|---|---|---|---|
| 6,323,776 | B1 * | 11/2001 | Jackson et al. | 340/679 |
| 7,333,676 | B2 | 2/2008 | Myers et al. | |
| 8,386,964 | B2 * | 2/2013 | Sun et al. | 715/863 |
| 8,463,073 | B2 * | 6/2013 | Ma et al. | 382/289 |
| 2006/0078214 | A1 | 4/2006 | Gallagher | |
| 2006/0093194 | A1 * | 5/2006 | Grady | 382/128 |
| 2007/0172141 | A1 * | 7/2007 | Bando | 382/261 |
| 2008/0111814 | A1 | 5/2008 | Sengamedu et al. | |
| 2008/0122858 | A1 * | 5/2008 | Wilensky | 345/592 |
| 2009/0009513 | A1 * | 1/2009 | van den Hengel et al. | 345/420 |
| 2009/0110241 | A1 | 4/2009 | Takemoto et al. | |
| 2009/0226094 | A1 | 9/2009 | Yamazaki | |
| 2010/0104199 | A1 * | 4/2010 | Zhang et al. | 382/199 |
| 2010/0208057 | A1 | 8/2010 | Meier et al. | |
| 2010/0277571 | A1 * | 11/2010 | Xu et al. | 348/47 |
| 2011/0055049 | A1 | 3/2011 | Harper et al. | |
| 2011/0129118 | A1 | 6/2011 | Hagbi et al. | |

(Continued)

FOREIGN PATENT DOCUMENTS

| EP | 1498847 A2 | 1/2005 |
| JP | 2011134343 A | 7/2011 |

OTHER PUBLICATIONS

He et al., "Guided Image Filtering", EOCV 2010, p. 1-14.*

(Continued)

*Primary Examiner* — Dave Czekaj
*Assistant Examiner* — Mohammad J Rahman
(74) *Attorney, Agent, or Firm* — Silicon Valley Patent Group LLP

(57) ABSTRACT

A reference in an unknown environment is generated on the fly for positioning and tracking. The reference is produced in a top down process by capturing an image of a planar object with a predefined geometric shape, detecting edge pixels of the planar object, then detecting a plurality of line segments from the edge pixels. The plurality of line segments may then be used to detect the planar object in the image based on the predefined geometric shape. An initial pose of the camera with respect to the planar object is determined and tracked using the edges of the planar object.

44 Claims, 9 Drawing Sheets

(56) References Cited

U.S. PATENT DOCUMENTS

| | | | |
|---|---|---|---|
| 2011/0222781 A1* | 9/2011 | Nguyen et al. | 382/218 |
| 2012/0133779 A1* | 5/2012 | Ma et al. | 348/175 |
| 2012/0269388 A1 | 10/2012 | Jiang et al. | |
| 2014/0010431 A1* | 1/2014 | Stayman | G06T 7/0012 382/131 |

OTHER PUBLICATIONS

Chia-Hoang Lee, "Structure And Motion From Two Perspectives Views Via Planar Patch". 19881205; 19881205-19881208. Dec. 5, 1998, pp. 158-164, XP010225200.
Dieter Koller, et al., "Real-time vision-based camera tracking for augmented reality applications", VAST '97, Jan. 1, 1997, pp. 87-94, XP055080580, New York, USA DOI: 10.1145/261135. 261152,1SBN: 978-0-89-791953-1.
International Search Report and Written Opinion—PCT/US2013/ 045013, International Search Authority—European Patent Office, Oct. 8, 2013.
Klinker G., et al., "Augmented Reality: A Balancing Act Between High Quality and Real-Time Constraints", Mixed Reality. Merging Real and Virtual Worlds. Proceedings Ofinternational Symposium on Mix Reality. Merging Real and Virtual Worlds, Jan. 1, 1993. pp. 325-346, XP001117806.
Lepetit V., et al., "Monocular Model-Based 3D Tracking of R1gid Objects: A Survey," Foundations and Trends in Computer Graphics and Vision, Now Publishers Inc. US. vol. 1. No. 1, Jan. 1, 2005. pp. 1-89, XP007903009. ISSN: 1572-2740.
Martin Hirzer, "Marker Detection for Augmented Reality Applications", Technical Report, ICG TR Aug. 2005, Oct. 27, 2008, 27 pages, XP055080592, URL:http://lrs.icg.tugraz.aVpubs/hirzer_tr_2008. pdf.
Polanski A., et al., "Stereo calibration by planar grid lines", Sep. 6, 1995, Conference Info: Computer Analysis of Images and Patterns. Springer Berlin Heidelberg, Berlin. Heidelberg, pp. 456-463, XP019181022. ISBN: 978-3-540-60268-2.
Rong Zhang, "Camera Calibration", ECE 661 Computer Vision Homework 8, Nov. 20, 2008, pp. 1-43, XP055080419, http:// engineerlng.purdue.edu/kak/courses-1-teach/ECE661.08/solution/ 11w8s1.pdf.
ARTookKit Home Page; http://www.hitl.washington.edu/artoolkit/, downloaded Jul. 14, 2011.
Babaee-Kashany et al., "Camera pose estimation in soccer scenes based on vanishing points", 2010 IEEE International Symposium on Haptic Audio-Visual Environments and Games (HAVE), pp. 1-6, Oct. 2010.
Hagbi, et al., "Shape Recognition and Pose Estimation for Mobile Augmented Reality,".
IEEE Transactions on Visualization and Computer Graphics, vol. 17, No. 10, Oct. 2011, pp. 1369-1379.
Klein G., et al., "Parallel Tracking and Mapping on a Camera Phone", 2009 8th IEEE International Symposium on Mixed and Augmented Reality (ISMAR), Oct. 19-22, 2009, pp. 83-86.
Lee, W., et al., "Point-and-Shoot for Ubiquitous Tagging on Mobile Phones", 2010 9th IEEE International Symposium on Mixed and Augmented Reality (ISMAR), Oct. 13-16, 2010, pp. 57-64, XP031807035, ISBN: 978-1-4244-9343-2.
Rober M. Haralick et al., "Pose Estimation for Corresponding Point Data", IEEE Transactions on Systems, Man and Cybernetics, vol. 19, No. 6, pp. 1426-1446, 1989.
Yagi et al., "Dynamic Scene Analysis for a Mobile Robot in a Man-Made Environment", Journal of Institute of Electronics and Communication Engineers of Japan, Jun. 1986 vol. J69-D No. 6: 967-974.

* cited by examiner

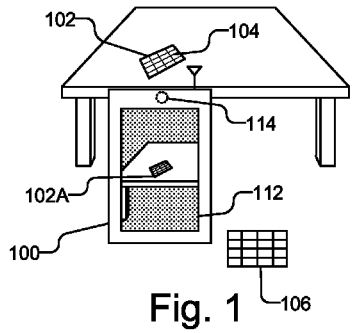
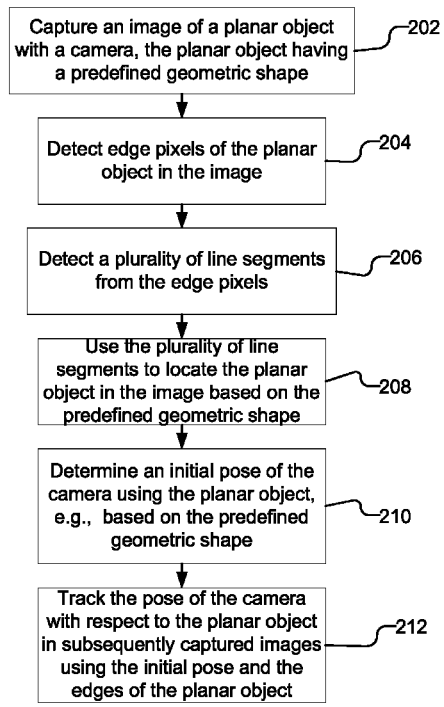
Fig. 1
Fig. 2

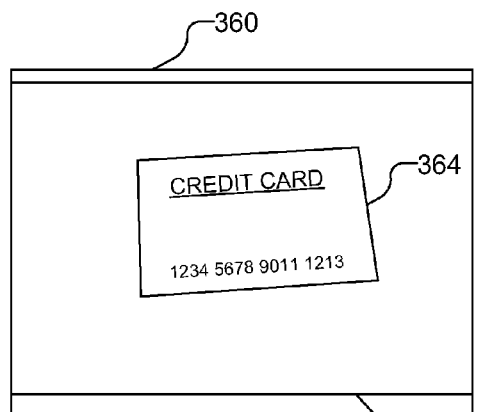
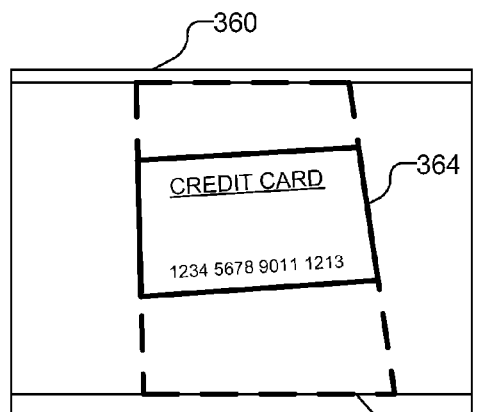
Fig. 12A    Fig. 12B
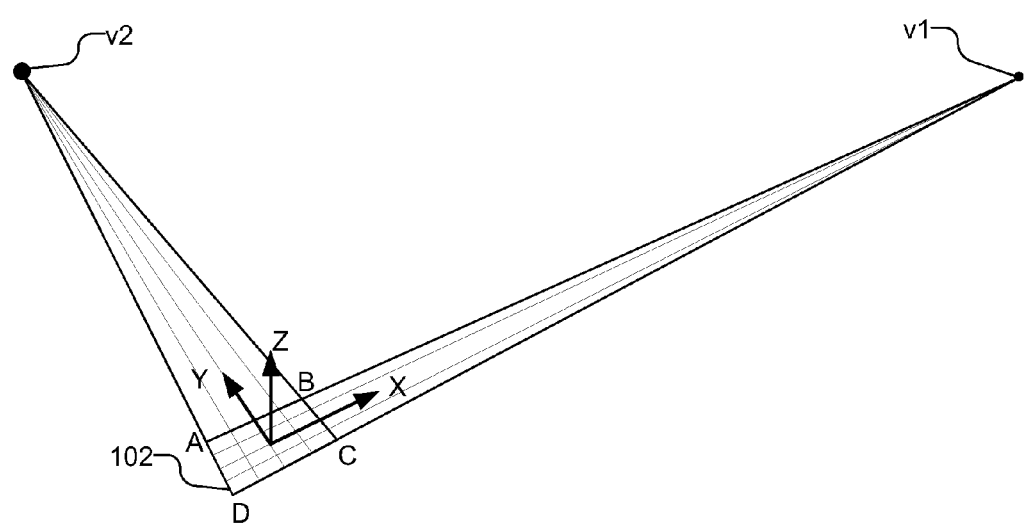
Fig. 13

ACCELERATED GEOMETRIC SHAPE DETECTION AND ACCURATE POSE TRACKING

BACKGROUND

1. Background Field

Embodiments of the subject matter described herein are related generally to pose detection and tracking, and more particularly using a geometric shape as a reference for pose detection and tracking.

2. Relevant Background

Detecting and tracking a pose (translation and orientation) of a camera with respect to an imaged environment is useful in applications such as Augmented Reality (AR). In an AR type application, the displayed images of the real world are augmented by rendering virtual objects, i.e., computer generated objects, over the displayed images. In order to tightly register the virtual augmentation to the real-world environment in the displayed images, a tracking system needs to accurately estimate the camera's pose with respect to the environment and track the pose as the camera is moved with respect to the environment.

Vision based tracking systems for augmented reality typically use a known reference in the real-world environment, which may be, e.g., a 3D model of the environment, artificial markers placed in the environment, or a front view of a planar surface in the environment. With the use of a known reference, the pose of the camera with respect to a reference can be determined and tracked using captured images, e.g., frames of video, that include the reference. However, it is not always convenient or possible to obtain the reference before performing AR or other such applications. The dependency on a prior knowledge of a reference in the environment is a limitation in the usage of augmented reality type applications. Thus, it is desirable to generate a reference from an image of an environment on the fly.

SUMMARY

A reference in an unknown environment is generated on the fly for positioning and tracking. The reference is produced in a top down process by capturing an image of a planar object with a predefined geometric shape, detecting edge pixels of the planar object, then detecting a plurality of line segments from the edge pixels. The plurality of line segments may then be used to detect the planar object in the image based on the predefined geometric shape. An initial pose of the camera with respect to the planar object is determined and tracked using the edges of the planar object.

In one implementation, a method includes capturing an image of a planar object with a camera, the planar object having a predefined geometric shape; detecting edge pixels of the planar object in the image; detecting a plurality of line segments from the edge pixels; using the plurality of line segments to detect the planar object in the image based on the predefined geometric shape; determining an initial pose of the camera using the planar object; and tracking the pose of the camera with respect to the planar object in subsequently captured images using the initial pose and the edges of the planar object.

In one implementation, a mobile device includes a camera for capturing an image of a planar object, the planar object having a predefined geometric shape; and a processor coupled to the camera for receiving the image of the planar object, the processor is adapted to detect edge pixels of the planar object in the image; detect a plurality of line segments from the edge pixels; use the plurality of line segments to detect the planar object in the image based on the predefined geometric shape; determine an initial pose of the camera using the planar object; and track the pose of the camera with respect to the planar object in subsequently captured images using the initial pose and the edges of the planar object.

In one implementation, a mobile device includes means for capturing an image of a planar object with a camera, the planar object having a predefined geometric shape; means for detecting edge pixels of the planar object in the image; means for detecting a plurality of line segments from the edge pixels; means for using the plurality of line segments to detect the planar object in the image based on the predefined geometric shape; means for determining an initial pose of the camera using the planar object; and means for tracking the pose of the camera with respect to the planar object in subsequently captured images using the initial pose and the edges of the planar object.

In one implementation, a non-transitory computer-readable medium including program code stored thereon includes program code to detecting edge pixels of the planar object in an image captured with a camera, the planar object having a predefined geometric shape; program code to detect a plurality of line segments from the edge pixels; program code to use the plurality of line segments to detect the planar object in the image based on the predefined geometric shape; program code to determine an initial pose of the camera using the planar object; and program code to track the pose of the camera with respect to the planar object in subsequently captured images using the initial pose and the edges of the planar object.

BRIEF DESCRIPTION OF THE DRAWING

FIG. 1 illustrates a mobile device capable generating, in real time, a reference from an image of an unknown environment which may be used for positioning and tracking.

FIG. 2 is a flow chart illustrating a method of detecting a planar object with a predefined geometric shape in an unknown environment and determining and tracking a pose with respect to the planar object.

FIG. 12A illustrates an image that includes a portion of a table and a planar object FIG. 12B illustrates possible planar objects detected in the image shown in FIG. 12A.

FIG. 13 illustrates detecting vanishing points from the planar object, which may be used to initialize the pose of the camera.

DETAILED DESCRIPTION

Figure 3:
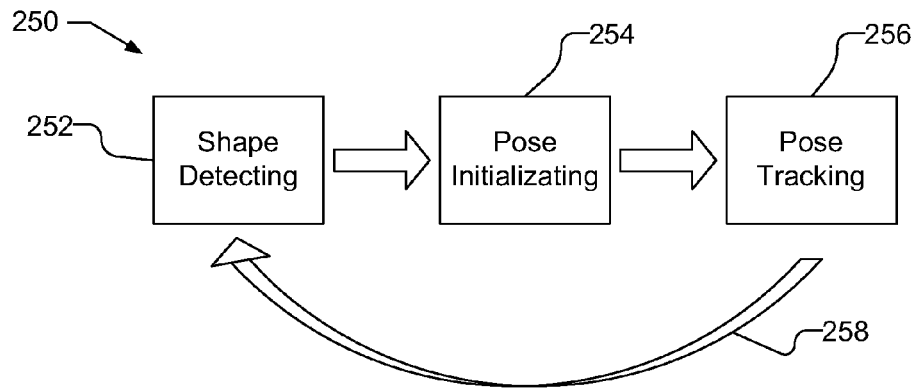
FIG. 3 illustrates an overview of the process used by mobile device for planar object detection, pose detection and tracking.

FIG. 1 illustrates a mobile device 100 capable generating, in real time, a reference from an unknown environment which may be used for positioning and tracking, e.g., in AR type applications. As used herein, a mobile device refers to any portable electronic device such as a cellular or other wireless communication device, personal communication system (PCS) device, personal navigation device (PND), Personal Information Manager (PIM), Personal Digital Assistant (PDA), or other suitable mobile device including wireless communication devices, computers, laptops, tablet computers, etc. that are capable of capturing images of the environment, which may be used in vision-based position detection and tracking. The mobile device may be capable of receiving wireless communication and/or navigation signals, such as navigation positioning signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

The mobile device 100 generates the reference by performing an initialization process with an image of the environment 104 that is captured by a camera 114. The environment 104 includes a planar object 102 that has a predefined geometric shape, which as illustrated in FIG. 1 may be a convex quadrilateral shape, e.g., rectangle shape, but other predefined geometric shapes may be used, i.e., an regular polygon such as an equilateral triangle, a regular pentagon or a hexagon, or e.g., two or more co-planar circles. It should be understood that the dimensions, sizes, color, etc. of the planar object 102 is not important, as long as the planar object 102 has the predefined geometric shape. By way of example, the planar object 102 in the environment 104 may be a piece of paper, business card, credit card, or any other object having the desired geometric shape, or any of the above printed on a piece of paper or other media, or a hand-drawn predefined geometric shape, or any of the above displayed on an electronic displaying device, e.g., image of a rectangle showing on a computer screen. For the sake of simplicity, the predefined geometric shape may sometimes be referred to herein as a rectangle, but it should be understood that the predefined geometric shape is not limited thereto.

The image 102A of the object 102 is illustrated as being displayed in the display 112 of the mobile device 100. From the captured image, the object 102 is detected based on the edges of the object 102 conforming to the predefined geometric shape. The process used to detect the object 102 with the predefined geometric shape in the environment uses a process in which the simplest primitives in an image are detected before detected the next primitive. For example, edge pixels are detected, followed by line segments, which are detected based on the edge pixels. Objects having the predefined geometric shape may then be detected based on the line segments. The object 102 may then be used to calculate the orientation and position (pose) from which a reference image 106 can be generated and used to track changes in pose of the mobile device 100. If desired, the reference image 106 may be transmitted to other mobile devices (not shown) so that a number of mobile devices viewing the object 102 all have the same reference image, which may be useful when the pose of multiple mobile devices with respect to each other, as well as the object 102, is desired, e.g., in AR gaming type applications. Additionally, features inside the detected planar object 102 may be extracted and used to assist in tracking.

FIG. 2 is a flow chart illustrating a method of detecting a planar object with a predefined geometric shape in an unknown environment and determining and tracking a pose with respect to the planar object. The mobile device 100 captures an image of a planar object with a camera, the planar object having a predefined geometric shape (202), which may be a convex quadrilateral or other desired shape. Edge pixels of the planar object are detected in the image (204). By way of example, a gradient of each pixel on a sparse grid may be determined and a pixel on the sparse grid is determined to be edge pixel when the pixel has a gradient with a larger magnitude than selected neighboring pixels and has a magnitude that is greater than a threshold. A plurality of line segments are detected from the edge pixels (206). For example, two edge pixels with gradient orientations that are approximately the same may be selected and if a percentage of edge pixels on a line between the two edge pixels is greater than a threshold, the edge pixels are determined to be on a line segment. Alternatively, junctions of line segments are determined using the detected edge pixels, and line segments are determined based on the junctions of line segments. The plurality of line segments are used to detect the planar object in the image based on the predefined geometric shape (208). For example, the plurality of line segments may be sampled to find line segments that satisfy a shape grammar for the predefined geometric shape. Line segments that belong to long coherent edges may be sampled more than the remaining line segments. For example, each of the plurality of line segments may be placed in a Hough transform bin based at least on gradient orientation, e.g., the Hough transform bin may be based on gradient orientation and intercept, and the probability of sampling a line segment is proportional to a total length of all line segments in the Hough transform bin that contains the line segment. Additionally, using the plurality of line segments to detect the planar object based on the predefined geometric shape may include generating a plurality of hypothesized objects in the image using the plurality of line segments and determining at least one hypothesized object that has the predefined geometric shape. When there are a plurality of hypothesized objects that have the predefined geometric shape, one of the hypothesized objects as the planar object is selected either manually or automatically. The process may further include qualifying the planar object for tracking. Qualification is used to avoid a pose error. For example, if the detected shape is a general trapezoid in 3D, and it is treated as a rectangle for pose estimation, erroneous camera poses will result. To be qualified, it must be determined that the detected shape has the predefined geometric shape, e.g., a detected quadrilateral is a rectangle, a detected triangle is an equilateral triangle, detected polygons are regular polygons, detected multiple ellipses are multiple circles, etc. The planar object may be qualified using manual input, a short baseline structure from motion with prior knowledge or a long baseline structure from motion. An initial pose of the camera is determined (210). For example, the initial pose may be with respect to the planar object in the image and is determined based on the predefined geometric shape (210), e.g., the initial pose is with respect to a 3D shape/model corresponding to the planar object. The pose of the camera with respect to the planar object in subsequently captured images using the initial pose and the edges of the planar object (212). Additionally, tracking may include extracting features within the planar object and using the extracted features in addition to the edges of the planar object.

A multiple hypothesis generation and testing process is used to detect the predefined geometric shape in the environment. Geometric primitives of increasing complexity are hypothesized and tested sequentially. In other words, the simplest primitives in an image are detected before using the detected primitive to detect the next primitive. For example, edge pixels are detected, followed by line segments, which are detected based on the edge pixels either directly or by junctions. Shape grammar is then used to detect the planar object from the line segments. Hypothesizing is performed for line segment or junction detection and shape grammar. Testing may use fast Bresenhan line traverse in conjunction with non-maximal suppression and orientation cue.

FIG. 3 illustrates an overview of the process used by mobile device 100 for planar object detection, pose detection and tracking. As can be seen, shape detecting 252 is used, in which a planar object having a predefined geometric shape is detected in an image of an unknown environment. By way of example, the predefined geometric shape may be a convex quadrilateral, such as a rectangle, or other shapes, such as an equilateral triangle, regular polygons, multiple circles, etc. Once the shape is detected 252, pose initializing 254 is performed to determine the initial pose of the camera with respect to the detected planar object. With the pose initialized, pose tracking 256 is performed to track the pose of the camera with respect to the detected planar object as the camera is moved with respect to the detected planar object. As indicated by arrow 258, if tracking is lost, the process reverts to shape detecting 252 to re-detect the planar object or detect a new planar object with the predefined geometric shape.

Figure 4:
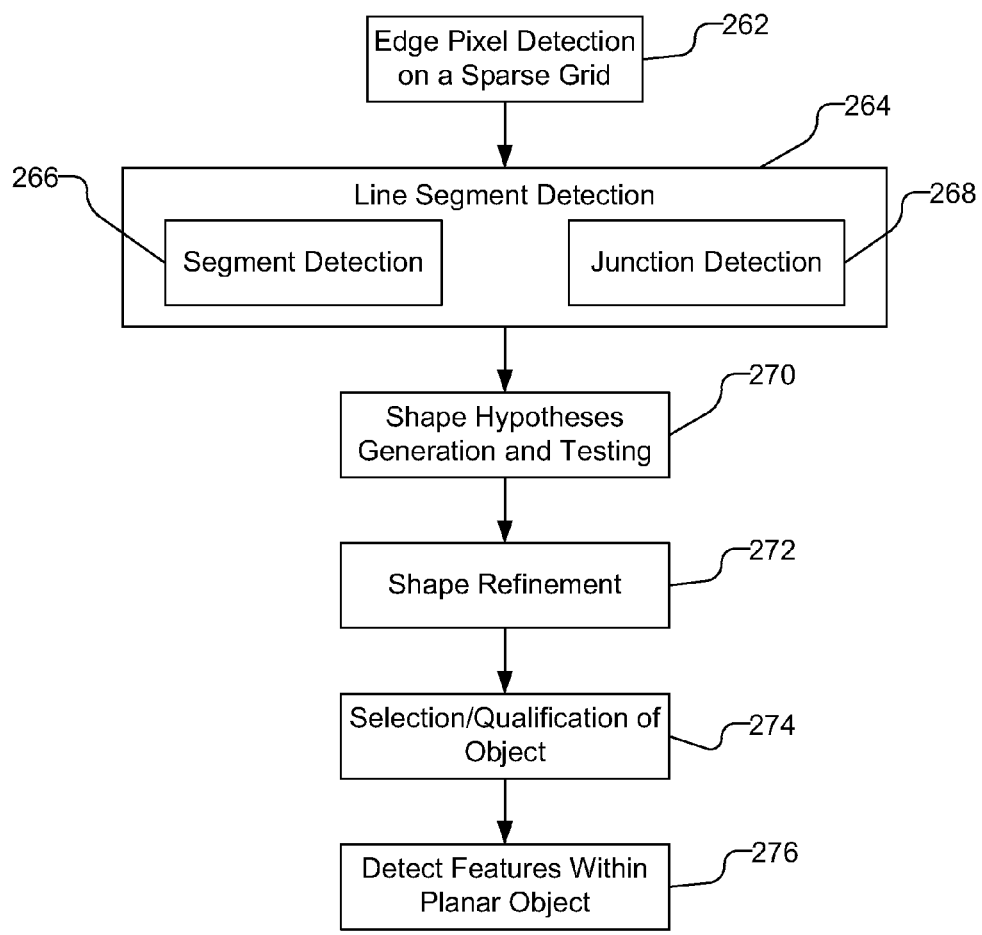
FIG. 4 is a flow chart of the process of shape detecting.
Figure 5:
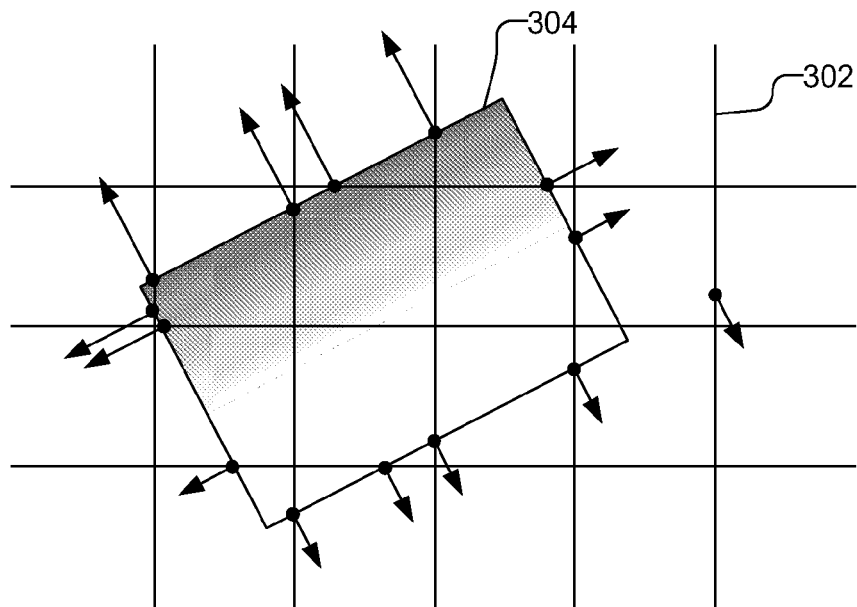
FIG. 5 illustrates a detecting edge pixels in an image with a sparse grid.

FIG. 4 is a flow chart of the process of shape detecting 252. As discussed above, the detection of the predefined geometric shape in an image of the environment is a hypothesis generation and testing process in which the simplest primitives in the image are detected before using the detected primitive to detect the next primitive. Thus, as illustrated in FIG. 4, edge pixels are detected on a sparse grid (262). FIG. 5, by way of example, illustrates a sparse grid 302 over a portion of an image that includes a planar object 304. The sparse grid may be a grid 8×8 pixel cells, or other dimensions. A gradient magnitude and a gradient orientation of each pixel on the sparse grid are calculated, e.g., using Sobel filtering as provided in equitation 1.

$$\nabla I_x = \begin{pmatrix} -1 & 0 & 1 \\ -2 & 0 & 2 \\ -1 & 0 & 1 \end{pmatrix}; \nabla I_y = \begin{pmatrix} -1 & -2 & 1 \\ 0 & 0 & 0 \\ -1 & 2 & 1 \end{pmatrix} \quad \text{eq. 1}$$

If desired, other appropriate edge detection operators may be used in place of Sobel filtering, such as Canny, Canny-Deriche, Differential, Prewitt, Roberts Cross, or other appropriate operators. A non-maximum suppression is used on the gradient direction. Thus, as illustrated in FIG. 5, each pixel of the planar object 304 that is on the sparse grid 302 is illustrated with a measured normal direction, i.e., orientation, and a gradient magnitude, shows respectively by the direction and length of the arrows. The magnitude of the gradient for each pixel on the sparse grid 302 is compared to the gradient magnitude of a neighboring pixel along the gradient direction, i.e., the nearest neighboring pixel in the direction of the gradient, and the nearest neighboring pixel in the opposite direction of the gradient. If the pixel on the sparse grid 302 is determined to have a gradient magnitude that is greater than the gradient magnitude of its neighboring pixels, the pixel is determined to be an edge pixel. If desired, the gradient magnitude of each pixel on the sparse grid 302 may also be required to be greater than a threshold to be an edge pixel in order to filter noise.

With the simplest primitives, i.e., edge pixels, in the image detected, the next primitive is detected. Thus, as illustrated in FIG. 4, once the edge pixels are detected (262), line segments are detected (264) based on the edge pixels. A plurality of line segments in the image may be detected directly by segment detection (266) or indirectly by junction detection (268).

Figure 6:
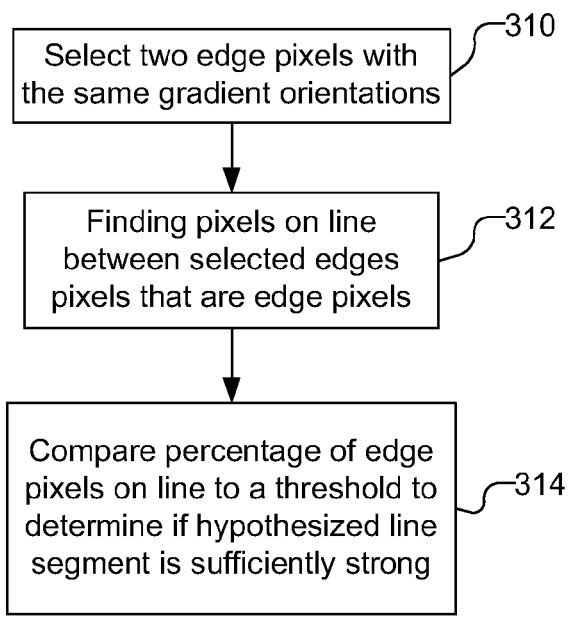
FIG. 6 is a flow chart illustrating a method of line segment detection using segment detection.

FIG. 6 is a flow chart illustrating a method of line segment detection using segment detection (266). As illustrated, two edge pixels that have gradient orientations within a predefined tolerance from each other are selected (310). For example, the tolerance may be 22.5°, but other tolerances may be used. The selection of the two edge pixels may also be dependent on the distance between the edge pixels, i.e., the two edge pixels should be separated by more than a threshold distance. For example, the threshold distance may be 6 pixels, but other threshold distances may be used. Pixels that are edge pixels on a hypothesized line between the two selected edge pixels are then found (312). The determination of whether a pixel is an edge pixel maybe performed as discussed above, but the pixels analyzed are on the line between the two selected edge pixels as opposed to being on a sparse grid. If desired, only a sampling of pixels on the line may be analyzed instead of every pixel, i.e., every other pixel may be analyzed. The percentage of edge pixels on the hypothesized line segment (314) is compared to a threshold to determine if the hypothesized line segment is sufficiently strong (314). For example, for a threshold of 50%, a hypothesized line between the two edge pixels that has more than 50% edge pixels will be considered to be a line segment. The process may be repeated for all possible edge pixel pairs, i.e., pixel pairs with the same gradient orientations and being separated by more than a threshold distance.

Figure 7:
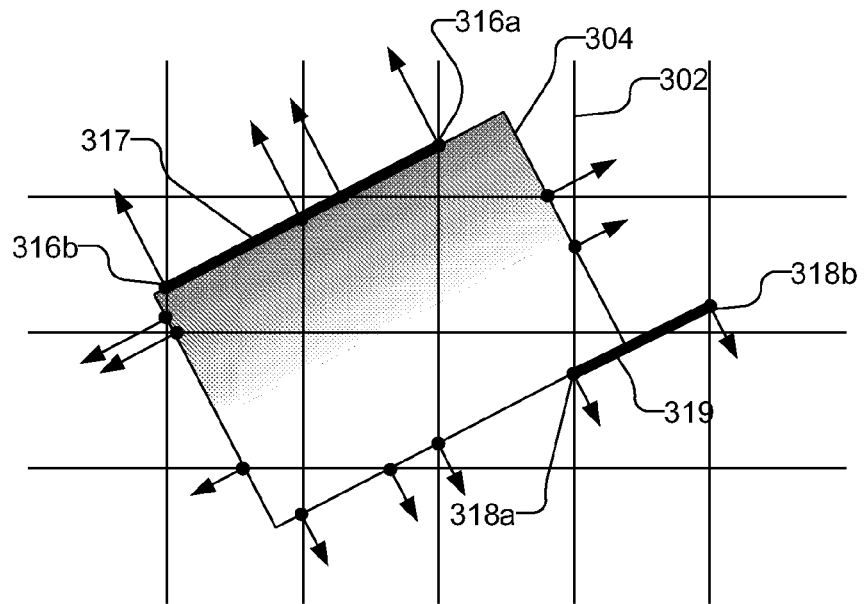
FIG. 7 illustrates directly detecting line segments.

FIG. 7, by way of example, illustrates the sparse grid 302 and planar object 304 of FIG. 5 and line segment detection by directly detecting segments. FIG. 7 illustrates two pairs of selected edge pixels 316a, 316b and 318a, 318b with corresponding hypothesized lines 317 and 319. The percentage of pixels on hypothesized line 317 that are edge pixels will be relatively high, e.g., 95%, while the percentage of pixels on hypothesized line 319 that are edge pixels will be relatively low, e.g., 20%. Thus, by comparing the percentages of edge pixels on a line to a threshold, it may be determined that hypothesized line 317 is a line segment and that hypothesized line 319 is not a line segment.

Figure 8:
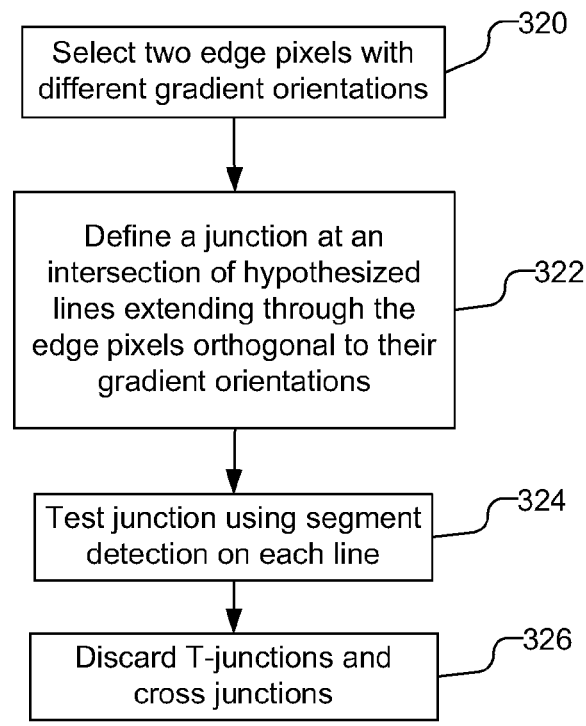
FIG. 8 is a flow chart illustrating a method of line segment detection using junction detection.

The line segment detection may also be performed based on junction detection (268), in which junctions of lines extending from the edge pixels are detected and line segments are detected based on the junctions. FIG. 8 is a flow chart illustrating a method of line segment detection using junction detection (268). As illustrated, two edge pixels having different gradient orientations are selected (320). The gradient junctions should have gradient orientations that differ by more than a predetermined amount. For example, when the predefined geometric shape is a rectangle, the junctions should ideally be orthogonal. However, due to perspective in the image of the object, junctions of a rectangle may vary from orthogonal. Accordingly, a range of gradient orientations, e.g., 45° to 90° may be used for a rectangle. The selection of the two edge pixels may also be dependent on the distance between the edge pixels, i.e., the two edge pixels should be separated by more than a threshold distance, e.g., 6 pixels. Junctions at the intersection of hypothesized lines extending through the selected edge pixels in directions orthogonal to the pixels' gradient orientations are defined (322). The process may be limited only to junctions that are hypothesized to be in the area of the image. The junction is tested by using the segment detection process for the lines extending through the selected edge pixels (326) in a manner similar to that described in FIG. 6. In other words, for the lines extending between the junction and selected edge pixels, the percentage of edge pixels is determined and compared to a threshold to determine if the two edge pixels and the junction are on line segments. Additionally, any T-junctions or cross junctions are discarded (328). T-junctions are junctions with one line segment extending past the junction, and cross junctions are junctions with both line segments extending past the junction. To detect T-junctions and cross junctions, the hypothesized lines that extend between the junction and the selected edge pixels may be hypothesized to extend a distance past the junction, e.g., the distance may be 25% to 50% of the length of the line between the junction and the selected edge pixel. The lines that are extended past the junctions may then be tested using the segment detection process to determine if they are line segments. If the extended lines are determined to be line segments, the junction and corresponding line segments may be discarded as a T-junction or cross junction.

Figure 9:
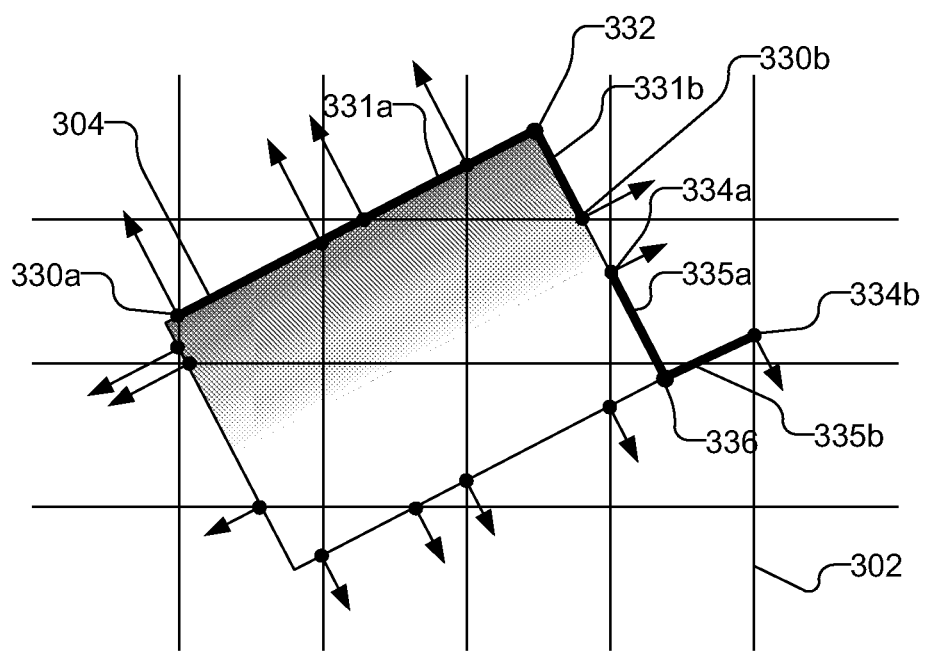
FIG. 9 illustrates detecting line segments using junction detection.

FIG. 9, by way of example, illustrates the sparse grid 302 and planar object 304 of FIG. 5 and line segment detection by junction detection. FIG. 9 illustrates two pairs of selected edge pixels 330a, 330b and 334a, 334b, which were selected based on their having different gradient orientations and being sufficiently separated. Additionally, junctions 332 and 336 are hypothesized based on the intersection of lines extending through and in a direction orthogonal to the gradient orientations of the selected edge pixels 330a, 330b and 334a, 334b, respectively. Lines 331a and 331b extending between the junction 332 and selected edge pixels 330a and 330b, respectively, and lines 335a and 335b extending between the junction 336 and selected edge pixels 334a and 334b, respectively, are then tested to determine if they are line segments. As can be seen, lines 331a and 331b are line segments belonging to planar object 304. Additionally, while line segment 335a will be detected as a line segment, line 335b will not be detected as a line segment.

Referring back to FIG. 4, with the detection of the simplest primitives, i.e., edge pixels (262) and the next primitives, i.e., line segments (264), the next primitive for the planar object, i.e., the shape, is detected. Thus, as illustrated in FIG. 4, shape hypotheses are generated and tested (270). The shape hypotheses are generated by sampling the plurality of line segments detected in the image to find line segments that satisfy a shape grammar for the predefined geometric shape. In some implementations, line segments that belong to long, coherent edges may be sampled more often than other line segments, e.g., when the predefined geometric shape has straight sides, such as with a convex quadrilateral. To determine which line segments belong to long, coherent edges, a Hough transformation, or other appropriate transformation may be used. The Hough transform describes a line with a given orientation and a distance from the origin. For example, each of the plurality of detected line segments may be placed into a Hough transform bin based on gradient orientation and intercept, i.e., distance from the origin. Each line segment votes for a single point in the Hough space, and the weight of a line segment is proportional to its length. Aligned line segments, i.e., line segments with the same gradient orientation and intercepts, will fall into the same bin in the Hough map, thereby reinforcing each other. In other words, if there are multiple lines with similar orientation in the same bin, then the probability of sampling lines from that bin is higher.

Figure 10:
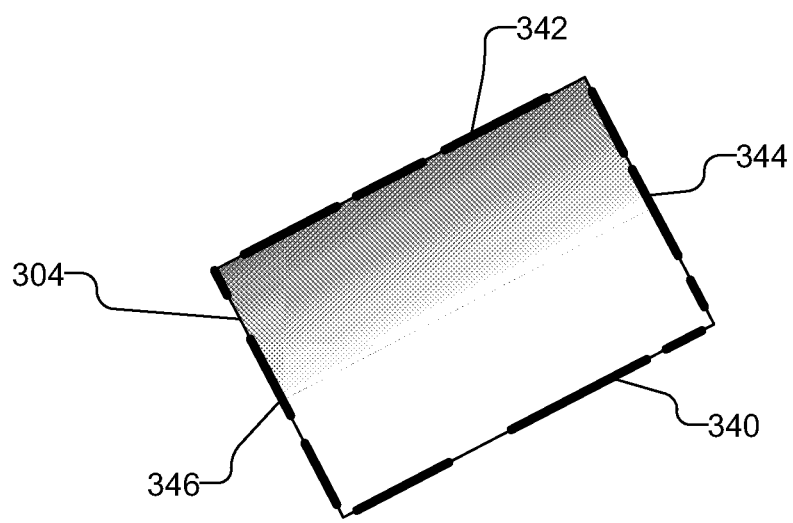
FIG. 10 illustrates using a plurality of line segments to detect the planar object.

The line segments are sampled to determine if they conform to the shape grammar for the predefined geometric shape. For example, for a convex quadrilateral, such as a rectangle, the shape grammar requires two sets of parallel lines, with the two sets intersecting at right angles, where the lines are parallel within a given tolerance, e.g., ±45°, and the perpendicular lines are perpendicular within a given tolerance, e.g., e.g., ±45°. FIG. 10, by way of illustrates, shows a plurality of line segments that have been detected for the planar object 304. Thus, a first line segment 340 may be sampled based, e.g., on a probability that is proportional to the Hough weights. A search for a second parallel line is performed, where lines are determined to be parallel if they subtend an angle to the first line that is less than a given tolerance, e.g., ±45°. A search of a third line segment that is approximately perpendicular to the first and second line segments and is between the first and second line segments is performed and line segment 344 is identified. By way of example, the third line segment may have an orientation that is greater than 45° to the first line segment. A search for a fourth line segment that is parallel to the third line segment and between the first and second line segments is performed and the fourth line segment 346 is identified. The intersections of the line segments may be required to be within the area of the image. In other words, it is desired to detect rectangles within an image; so the orthogonal sides of the rectangle should intersect within the given image space (i.e. the intersection point should be within [0,w] and [0,h] where w and h are width and height of the image respectively. Of course, if desired, the shape grammar may be applied to the line segments in a different order, e.g., all parallel line segments may be found, followed by determining which sets of parallel line segments are approximately perpendicular. The process may be repeated a fixed number of hypothesis generation trials or until all line segments have been sampled. If the predefined geometric shape is convex, the hypothesized geometric shapes are tested for convexity and non-convex shapes are discarded at this stage.

The identified line segments 340, 342, 344, and 346 are on the four edges of a hypothesized shape, which is then tested (270 in FIG. 4). Testing of the hypothesized shape may use fast Bresenham line traversal in conjunction with non-maximal suppression and orientation cue and may be performed, e.g., by determining the percentage of edge pixels along the edges of the hypothesized shape and comparing the percentage to a threshold, as discussed above for line segment detection. Bresenham line traversal is a known technique in graphics for efficiently traversing a straight line and marking the pixels at integer locations. Using Bresenham line traversal, the pixel locations are determined and for each pixel the gradient magnitude is checked to determine if it is greater than its neighboring pixels to qualify it as an edge pixel. The gradient orientations of the pixels are also checked to ensure it is similar to other pixels in the line. Accordingly, if the percentage of edge pixels on the hypothesized shape is greater than a threshold of, e.g., 90%, the hypothesized shape is determined to be the planar object having the predefined geometric shape.

Figure 11A:
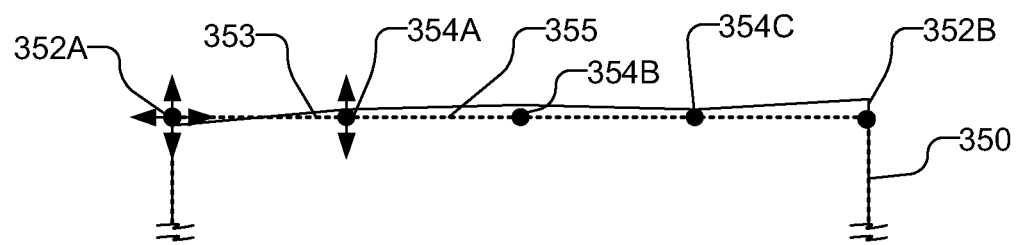
FIGS. 11A and 11B illustrate a refinement of a portion of a detected hypothesized shape.
Figure 11B:
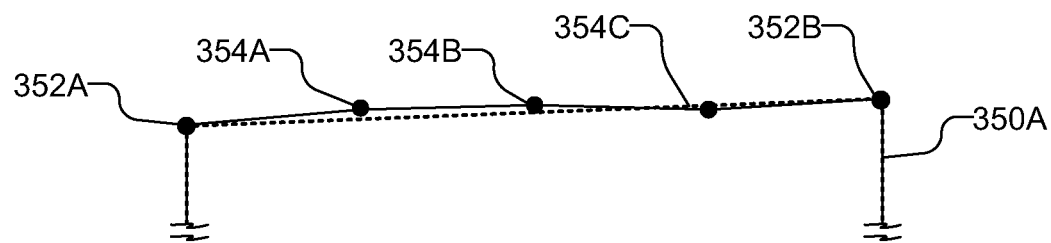

As illustrated in FIG. 4, with the shape detected, shape refinement (272) may be performed. Shape refinement, for example, may be performed using a greedy search for the best score. Where slightly bent edges are determined, e.g., due to a bent object or camera distortions, the edge of the object may be approximated using line segments. FIG. 11A, by way for example, illustrates a portion of a detected hypothesized shape 350, illustrated with a dotted line, that is to refined to find a best fit with the shape 351 in the image. Refinement of the hypothesized shape 350 may be performed by individually and sequentially moving corner points 352A and 352B and a plurality of line points 354A, 354B, and 354C, that are distributed along each line. The corner points 352A, 352B and line points 354A, 354B, and 354C, are moved to find the best fit for each line segment between neighboring points. Thus, for example, corner point 352A may be moved in a 5×5 pixel region, illustrated by the arrows, to find a position with the greatest percentage of edge pixels along line segment 353. With the position of corner point 352A updated, line point 354A may be moved along a normal direction, i.e., ±2 pixels, illustrated by the arrows, to find a position with the greatest percentage of edge pixels along line segment 355. If desired, the previous line segment or line segments may be considered when finding the position for the next point that provides the greatest percentage of edge pixels, e.g., line segment 355 may be combined with line segment 353 when finding the position for line point 354B. The process continues until each corner point and line point is updated, as illustrated in FIG. 11B. Of course, the entire hypothesized shape is refined in such as manner and not only the portion shown in FIGS. 11A and 11B. Additionally, if desired, the process may be iteratively performed, e.g., by updating corner and line points sequentially more than once while relying on previously updated positions of the points. As further illustrated in FIG. 11B, the corner points 352A and 352B are then connected using a straight line 356 to define a refined hypothesized shape 350A. If desired, rather than connecting the corner points, a line that is a best fit for all the corner points and lines points may be used.

The process of shape detection may result in more than one planar object identified as having the predefined geometric shape. For example, if the captured image includes papers and books on a table, the papers and books may all be detected as having planar objects with the predefined geometric shape. When a plurality of planar objects is identified as having the predefined geometric shape, one of the planar objects is selected for tracking (274). The selection of the planar object may be either manually by a user or automatically. For example, if more than one planar object is identified, the display 112 of the mobile device may indicate the identified planar objects and the user may select the planar object. A user may manually select an appropriate object, e.g., using the touch screen display 112 or other appropriate input mechanism.

Additionally, the planar object may be automatically selected, e.g., based on heuristics. For example, an average contrast of the detected planar objects may be used as the selection metric. An area weighted average contrast may be calculated as:

$$\text{Average\_Contrast} = \frac{I_{out} - I_{in}}{N} \qquad \text{eq. 2}$$

where $I_{out}$ is the total intensity of a predetermined width of boundary pixels outside the planar object, $I_{in}$ is the total intensity of a predetermined width of boundary pixels inside the planar object, and N is the number of boundary pixels. The planar object with the highest area weighted average contrast may be selected.

Qualification of the planar object may be used to ensure that the planar object has the predefined geometric shape so that pose errors are avoided. For example, as illustrated in FIG. 12A, an image 360 that includes a portion of a table 362 and a planar object 364, which may be, e.g., a credit card. As illustrated with bold lines in FIG. 12B, the planar object 364 may be correctly detected as a planar object having a predefined geometric shape of a rectangle. However, as illustrated by the dotted lines, a portion of the table 362 and sides of the planar object 364 may be incorrectly identified as a planar object having the shape of a rectangle and would cause pose errors if used as the detected planar object. Manual selection of the appropriate object may be used to qualify the planar object (274, FIG. 4) as the user can easily identify planar objects with the predefined geometric shape.

If desired, the qualification process may be a separate action performed after selection (274) of the planar object. Qualification may use a long baseline or short baseline Structure from Motion (SfM) analysis to verify that the detected planar object has the predefined geometric shape. For example, a long baseline structure from motion (SfM) may be used to generate a frontal view of the detected planar object and the predefined geometric shape may then be verified based on a specific criterion for the predefined geometric shape, e.g., an orthogonality condition may be checked for a rectangle. The long baseline is performed after detecting a planar object in a number N of frames, which may be, e.g., 50 to 100. Two frames are selected, e.g., frame 1 and frame k, where 2<=k<=N. For the two chosen frames, a homography (H) transform between these two frames is determined and decomposed into rotation (R), translation (T) and normal (N) components. Based on the decomposed homography (H), a frontal view of a frame, e.g., frame k can be determined. The detected planar object in the frontal view may then be analyzed to determine if it has the criterion for the predefined geometric shape. An example of criterion that may be used for a predefined geometric shape is that the edges are near-orthogonal, e.g., within ±2° from 90°, when the predefined geometric shape is a rectangle. Of course, other appropriate criterion may be used, particularly for different predefined geometric shapes. If the detected planar object meets the criterion for the predefined geometric shape in the frontal view, the planar object is qualified to be used for tracking. If the detected planar object does not meet the criterion for the predefined geometric shape in the frontal view, a different detected planar object may be selected and qualified.

A short baseline SfM analysis may also be used for qualification. The short baseline SfM is similar to the long baseline SfM, except there are fewer frames, e.g., N is approximately 5. With fewer frames, the information content can be noisy, thus making it more difficult to verify the predefined planar shape with high confidence. Short baseline SfM may be based on the prior information, or assumption, that the environment captured in the image includes many planar objects with the predefined geometric shape, e.g., that there are many rectangles visible in the scene.

Based on this assumption, the criterion for the predefined geometric shape may be relaxed compared to the long baseline SfM process. Thus, the frontal view of the frame is generated based on a decomposed homography (H), and the detected planar object may be analyzed using a criterion for the predefined geometric shape. By way of example, the criterion may be that the edges are near-orthogonal, e.g., within ±10° from 90° when the predefined geometric shape is a rectangle. If the detected planar object meets the criterion for the predefined geometric shape in the frontal view, the planar object is qualified to be used for tracking. If the detected planar object does not meet the criterion for the predefined geometric shape in the frontal view, a different detected planar object may be selected and qualified.

With the planar object detected and qualified, pose initializing 254 (FIG. 3) is performed. Pose initializing determines an initial pose of the camera with respect to the detected planar object by reconstructing a three dimensional shape from the detected planar object in the two dimensional image. Where the predefined geometric shape is a rectangle, the pose of the planar object may be detected by determining the vanishing points $v_1$ and $v_2$ of the edges from which the orientation of the planar object can be determined. For example, as illustrated in FIG. 13, the first vanishing point v1 of a detected planar object 102, having corners (a, b, c, d) may be defined as corresponding to the x-axis X for the real world coordinate system and a second vanishing point v2 may be defined as corresponding to the y-axis Y. Of course, the vanishing points v1 and v2 may be defined as corresponding to any orthogonal axes using appropriate transformations. The vanishing points v1 and v2 may be determined as:

$$v_1 = (b-a) \times (c-d)$$

$$v_2 = (c-b) \times (d-a) \quad \text{eq. 3}$$

We define normalized vectors $\hat{v}_1$ and $\hat{v}_2$ as $\hat{v}_1 = v_1 / \|v_1\|$ and $\hat{v}_2 = v_2 / \|v_2\|$ where $\| \|$ is the norm of a vector. The orientation R=[X|Y|Z] of the planar object 102 is computed as a 3×3 matrix that is defined as:

$$X = \hat{v}_1$$

$$Y = \hat{v}_2$$

$$Z = \hat{v}_1 \times \hat{v}_2 \quad \text{eq. 4}$$

The 3D world points of each of the four vertices i of the rectangle may be represented by $$\vec{X}_i = \begin{bmatrix} X_i \\ Y_i \\ Z_i \\ 1 \end{bmatrix} \quad \text{eq. 5}$$

Assuming the width of the rectangle is defined as 1 and the height of the rectangle is defined as h, equation 5 becomes:

$$\vec{X} = \begin{bmatrix} -.5 \\ -\frac{h}{2} \\ 0 \\ 1 \end{bmatrix}, \begin{bmatrix} .5 \\ -\frac{h}{2} \\ 0 \\ 1 \end{bmatrix}, \begin{bmatrix} .5 \\ \frac{h}{2} \\ 0 \\ 1 \end{bmatrix}, \begin{bmatrix} -.5 \\ \frac{h}{2} \\ 0 \\ 1 \end{bmatrix} \quad \text{eq. 6}$$

The 2D image points in homogenous coordinates is defined as:

$$\vec{x}_i = \begin{bmatrix} x_i \\ y_i \\ 1 \end{bmatrix} \quad \text{eq. 7}$$

The depth of each corner is defined as $d_i$. The camera calibration matrix is:

$$K = \begin{bmatrix} F_u & 0 & u \\ 0 & F_v & v \\ 0 & 0 & 1 \end{bmatrix} \quad \text{eq. 8}$$

Assuming there is no skew or radial distortion, then $F_u$, $F_v$ are the focal length and u, v are the offsets in the X and Y directions. The projection operator Π is the conversion from the 3D point to the 2D and is a (3×4) matrix represented as:

$$\Pi = \begin{bmatrix} 1 & 0 & 0 & 0 \\ 0 & 1 & 0 & 0 \\ 0 & 0 & 1 & 0 \end{bmatrix} \quad \text{eq. 9}$$

The translation vector is a (3×1) matrix:

$$T = \begin{bmatrix} t_x \\ t_y \\ t_z \end{bmatrix} \quad \text{eq. 10}$$

Using a series of linear equations, the translation T and aspect ratio of the planar object may be determined.

$$d_i * \vec{x}_i = K * \Pi * \begin{bmatrix} R & T \\ 0 & 0 & 0 & 1 \end{bmatrix} * \vec{X}_i \quad \text{eq. 11}$$

Equation 11 will provide three linear equations for each of the four corners of the rectangle, i.e., there are 3*4=12 linear equations. Inserting the known variables K, R, $\vec{X}_i$, $\vec{x}_i$, and Π into equation 11 leaves 8 unknowns of the translation T, h, and the depth $d_i$ of the four corners, which can then be solved, e.g., using least square optimization. The pose computations will be correct up to a scaling factor.

Figure 14:
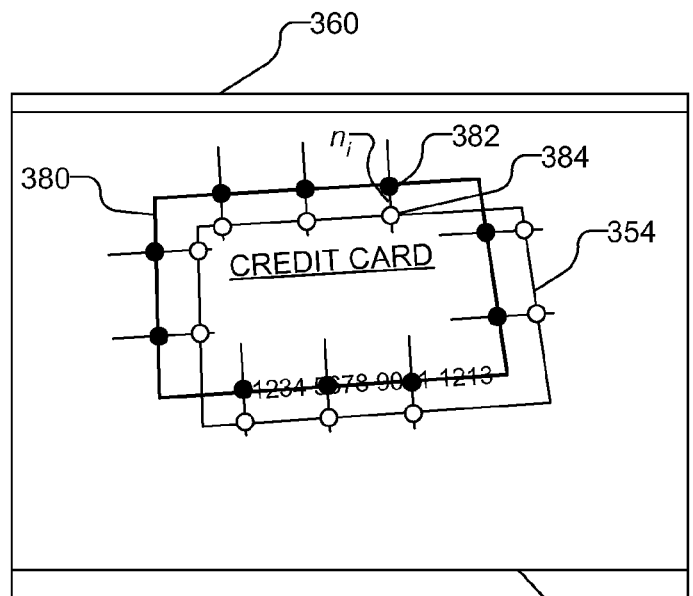
FIG. 14 illustrates edge based tracking

With the pose initialized, pose tracking 256 (FIG. 3) may use an iteratively re-weighted least squares optimization, sometimes referred to as an M-estimator, to track the pose of the camera with respect to the detected planar object as the camera is moved with respect to the detected planar object. Edge based tracking may be used with the weighted least squares optimization. FIG. 14 illustrates edge based tracking by way of example. As illustrated, a model 380 of the planar object 364 is projected in the image space 360 using a predicted camera pose. The predicted camera pose is composed of two parts: 1) estimated camera pose in the previous frame that is concatenated with; 2) a pose update since last frame. The pose update can be based on motion parameters obtained from motion sensors on the mobile device 100, such as accelerometers, gyroscopes or the like; or a software-based pose updater. The software-based pose updater estimates a dynamic model of the camera; e.g., by way of example, by maintaining a velocity vector of the camera and an acceleration vector of the camera, using estimated camera poses in the previous frames. Note that both positional and angular velocities and accelerations can be estimated in such a pose updater model. Points 382 on the model 380, illustrated with black dots in FIG. 14, are sampled using the reconstructed model and the estimated pose in the previous frame. Edge pixels 384, illustrated with white dots, are detected along the normal $n_i$ to the points 382. A distance function is defined between each point 382 on the model 380 and the detected edge pixel 384 as $$d_i(\theta)=\|n_i^T(T(x_i,\theta)-u_i)\|^2 \qquad \text{eq. 5}$$

where θ is the pose transformation parameters, i.e., both translation and rotation parameters, T is the transformation applied to point $x_i$ based on the parameters θ, $x_i$ is the 3D point coordinate, and $u_i$'s are the points in image space. By solving the following optimization problem, the position of the planar object 364 in the image space 360 may be determined:

$$\operatorname*{argmin}_{\theta} \sum_i \rho(d_i(\theta)) \qquad \text{eq. 6}$$

where the distance function d serves as an error term, and ρ is a robust estimation function that iteratively generates the weighted least squares problem in an M-estimator fashion. For example, the Tukey's robust function may be used.

If desired, the pose tracking may be performed using a pyramid tracker. For example, the image may be down sampled and a coarse patch based search performed at the coarsest level. The patch based search, e.g., 8×8 pixel patch, is centered on selected pixels at the last position of the planar object and used to find the edge pixels of the planar object in the current image. After the patch based search is completed, the edge based search may be performed at a finer level of resolution, with the detected edge pixels used as the selected points 382 in the current image. If desired, the edge based search may be performed at two levels of resolution, i.e., with a three level pyramid tracker.

If desired, however, other tracking techniques may be used. For example, conventional point based tracking may be used.

Figure 15:
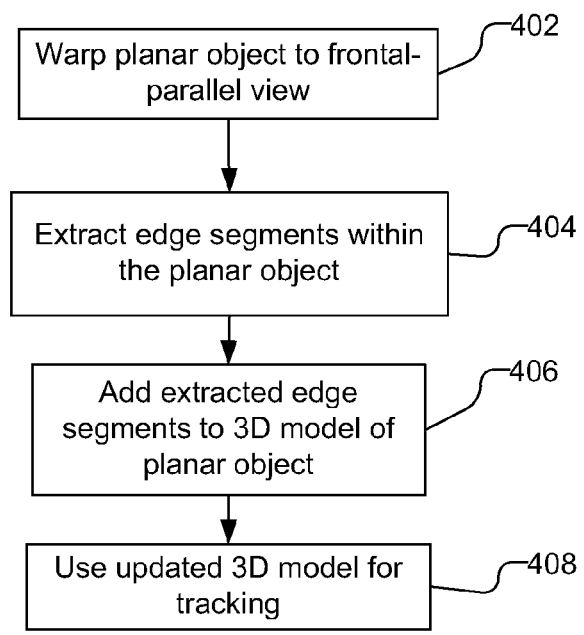
FIG. 15 illustrates a method of tracking using edges of the planar object and features detected within the planar object.

Additionally, if desired, once the planar object is reconstructed and tracked in 3D, features within the planar object may be detected and used to assist in tracking. For example, as illustrated in FIG. 15, the planar object may be warped to a frontal-parallel view (402) in which the aspect ratio is preserved. Edge segments within the planar object are extracted (404), e.g., using a conventional edge detection operator, such as Sobel, Canny, Canny-Deriche, Differential, Prewitt, Roberts Cross, or other appropriate operators, followed by edge based tracking. Alternatively, edge segments within the planar object may be detected using the segment detection 266 described above. The extracted edge segments within the planar object are added to the 3D model of the planar object (406) and tracking is performed using the updated 3D model (408), e.g., using the four sides of the planar object, as well as the internal edge segments.

Figure 16:
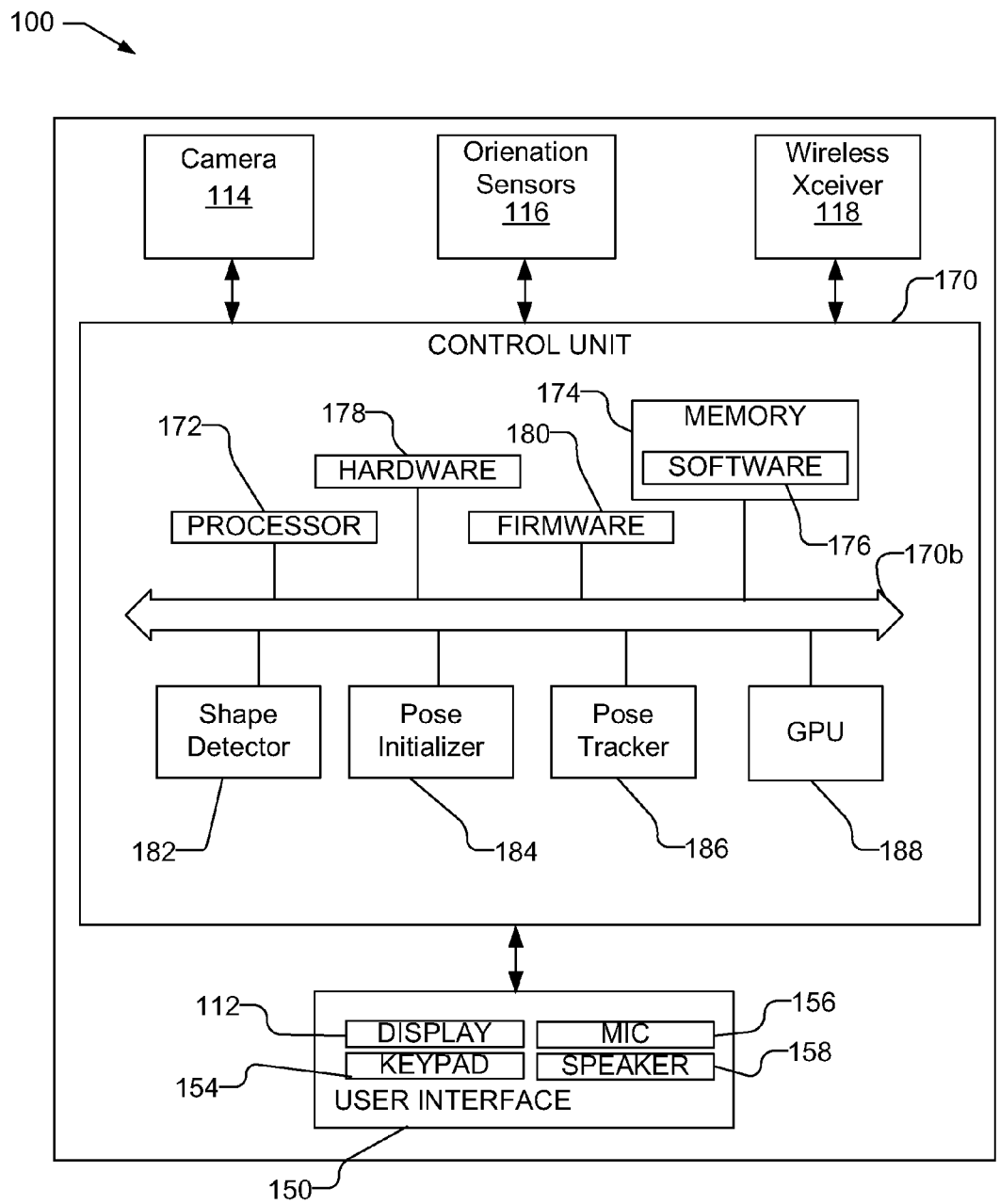
FIG. 16 illustrates a block diagram of the mobile device capable of generating a reference from an image of an unknown environment on the fly, e.g., for positioning and tracking, such as in AR type applications.

FIG. 16 illustrates a block diagram of a mobile device 100 capable of generating a reference from an image of an unknown environment on the fly, e.g., for positioning and tracking, such as in AR type applications. The mobile device 100 is illustrated as including a camera 114 for capturing an image of the environment, which may be either a photo or a frame of video. The mobile device 100 may also include orientation sensors 116 which may be used to provide data to assist in tracking. Examples of orientation sensors that may be used with the mobile device 100 include accelerometers, quartz sensors, gyros, or micro-electromechanical system (MEMS) sensors used as linear accelerometers, as well as magnetometers. The mobile device 100 may further include a wireless transceiver 118, which may be used to provide a generated reference image to other mobile devices, either directly or through a wireless network, which may be a wireless wide area network (WWAN), a wireless local area network (WLAN), a wireless personal area network (WPAN), and so on, or through cellular telephonic access points.

The mobile device 100 may also include a user interface 150 that includes the display 112 capable of displaying images, e.g., of the environment as well as rendered AR data if desired. The user interface 150 may also include a keypad 154 or other input device through which the user can input information into the mobile device 100. If desired, the keypad 154 may be obviated by integrating a virtual keypad into the display 152 with a touch sensor. The user interface 150 may also include a microphone 156 and speaker 158, e.g., if the mobile device is a cellular telephone. Of course, mobile device 100 may include other elements unrelated to the present disclosure.

The mobile device 100 also includes a control unit 170 that is connected to and communicates with the camera 114, orientation sensors 116, and wireless transceiver 118, as well as the user interface 150, along with any other desired features. The control unit 170 may be provided by a processor 172 and associated memory/storage 174, which may include software 176, as well as hardware 178, and firmware 180, and a bus 170b. The control unit 170 includes a shape detector 182 for detecting the planar object in an image, as discussed above. The control unit 170 may further include a pose initializer 184 and a pose tracker 186 to determine the pose of the mobile device 100 using the detected planar object and to track the pose of the mobile device as discussed above. The control unit 170 may further include a graphics processing unit (GPU) 188 for rendering AR data in response to the determined pose, which may then be displayed on display 112. The GPU 188 may also be used for general purpose programming techniques to accelerate the computer vision computational processing. The shape detector 182, pose initializer 184, pose tracker 186, and GPU 188 are illustrated separately and separate from processor 172 for clarity, but may be a combined and/or implemented in the processor 172 based on instructions in the software 176 which is run in the processor 172.

It will be understood as used herein that the processor 172, as well as one or more of the shape detector 182, pose initializer 184, pose tracker 186, and GPU 188 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the terms "memory" and "storage" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 178, firmware 180, software 176, or any combination thereof. For a hardware implementation, the shape detector 182, pose initializer 184, pose tracker 186, and GPU 188 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 174 and executed by the processor 172. Memory may be implemented within or external to the processor 172.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
    capturing an image of a planar object with a camera, the planar object having a predefined geometric shape;
    detecting edge pixels of the planar object in the image, wherein detecting edge pixels comprises:
        calculating a gradient magnitude and a gradient orientation of each pixel in the image on a sparse grid; and
        performing a non-maximum suppression by comparing the gradient magnitude of pixels on the sparse grid to gradient magnitudes of nearest neighboring pixels along the gradient orientation and that are not on the sparse grid;
    detecting a plurality of line segments from the edge pixels;
    using the plurality of line segments to detect the planar object in the image based on the predefined geometric shape;
    determining an initial pose of the camera using the planar object; and
    tracking a pose of the camera with respect to the planar object in subsequently captured images using the initial pose and edges of the planar object.

2. The method of claim 1, further comprising qualifying the planar object for tracking before determining the initial pose of the camera.

3. The method of claim 2, wherein qualifying the planar object for tracking comprises at least one of manual input, a short baseline structure from motion analysis or a long baseline structure from motion analysis.

4. The method of claim 1, wherein detecting edge pixels further comprises comparing the gradient magnitude of pixels on the sparse grid to a threshold.

5. The method of claim 1, wherein detecting the plurality of line segments comprises:
    selecting two edge pixels with gradient orientations that are within a predefined tolerance from each other;
    finding pixels on a line between the two edge pixels that are edge pixels; and
    comparing a percentage of edge pixels on the line between the two edge pixels to a threshold to determine if the two edge pixels are on a line segment.

6. The method of claim 1, wherein detecting the plurality of line segments comprises:
    selecting two edge pixels with different gradient orientations;
    defining a junction at an intersection of hypothesized lines extending through the two edge pixels, wherein each hypothesized line extends in a direction orthogonal to a gradient orientation of one of the two edge pixels;
    finding pixels on the hypothesized lines between the two edge pixels that are edge pixels; and
    comparing a percentage of edge pixels on the hypothesized lines between the two edge pixels to a threshold to determine if the two edge pixels and the junction are on line segments.

7. The method of claim 6, further comprising discarding a junction determined to be on a T-junction or cross junction.

8. The method of claim 1, wherein using the plurality of line segments to detect the planar object comprises:
    sampling the plurality of line segments to find line segments that satisfy a shape grammar for the predefined geometric shape.

9. The method of claim 8, further comprising:
    placing each of the plurality of line segments in a Hough transform bin based on gradient orientation and intercept, wherein a probability of sampling a line segment is proportional to a total length of all line segments in the Hough transform bin that contains the line segment.

10. The method of claim 1, wherein using the plurality of line segments to detect the planar object based on the predefined geometric shape comprises:
    generating a plurality of hypothesized objects in the image using the plurality of line segments; and
    determining at least one hypothesized object that has the predefined geometric shape.

11. The method of claim 10, wherein there are a plurality of hypothesized objects that have the predefined geometric shape, the method further comprising manually or automatically selecting one of the plurality of hypothesized objects as the planar object.

12. The method of claim 1, wherein the predefined geometric shape is a convex quadrilateral.

13. The method of claim 1, wherein the predefined geometric shape comprises a regular polygon.

14. The method of claim 1, wherein determining the initial pose of the camera is with respect to the planar object in the image comprises reconstructing a three dimensional shape from the planar object in the image.

15. The method of claim 1, wherein tracking the pose of the camera using the edges of the planar object comprises extracting features within the planar object and using the extracted features in addition to the planar object with the edges of the planar object.

16. The method of claim 1, wherein tracking the pose of the camera comprises down sampling the image and using patch based tracking on a coarse resolution level and using edge based tracking based on results of the patch based tracking on a fine resolution level.

17. A mobile device comprising:
a camera for capturing an image of a planar object, the planar object having a predefined geometric shape; and
a processor coupled to the camera for receiving the image of the planar object, the processor is adapted to detect edge pixels of the planar object in the image; detect a plurality of line segments from the edge pixels; use the plurality of line segments to detect the planar object in the image based on the predefined geometric shape; determine an initial pose of the camera using the planar object; and track a pose of the camera with respect to the planar object in subsequently captured images using the initial pose and edges of the planar object, wherein the processor is adapted to detect edge pixels by being adapted to:
calculate a gradient magnitude and a gradient orientation of each pixel in the image on a sparse grid; and
perform a non-maximum suppression by comparing the gradient magnitude of pixels on the sparse grid to gradient magnitudes of neighboring pixels along the gradient orientation and that are not on the sparse grid.

18. The mobile device of claim 17, wherein the processor is further adapted to qualify the planar object for tracking before the initial pose of the camera is determined.

19. The mobile device of claim 18, wherein the processor is adapted to qualify the planar object with at least one of manual input, a short baseline structure from motion analysis or a long baseline structure from motion analysis.

20. The mobile device of claim 17, wherein the processor is adapted to detect edge pixels by being adapted to compare the gradient magnitude of pixels on the sparse grid to a threshold.

21. The mobile device of claim 17, wherein the processor is adapted to detect the plurality of line segments by being adapted to:
select two edge pixels with gradient orientations that are within a predefined tolerance from each other;
find pixels on a line between the two edge pixels that are edge pixels; and
compare a percentage of edge pixels on the line between the two edge pixels to a threshold to determine if the two edge pixels are on a line segment.

22. The mobile device of claim 17, wherein the processor is adapted to detect the plurality of line segments by being adapted to:
select two edge pixels with different gradient orientations;
define a junction at an intersection of hypothesized lines extending through the two edge pixels, wherein each hypothesized line extends in a direction orthogonal to a gradient orientation of one of the two edge pixels;
find pixels on the hypothesized lines between the two edge pixels that are edge pixels; and
compare a percentage of edge pixels on the hypothesized lines between the two edge pixels to a threshold to determine if the two edge pixels and the junction are on line segments.

23. The mobile device of claim 22, wherein the processor is further adapted to discard a junction determined to be on a T-junction or cross junction.

24. The mobile device of claim 17, wherein the processor is adapted to use the plurality of line segments to detect the planar object by being adapted to:
sample the plurality of line segments to find line segments that satisfy a shape grammar for the predefined geometric shape.

25. The mobile device of claim 24, wherein the processor is further adapted to:
place each of the plurality of line segments in a Hough transform bin based on gradient orientation and intercept, wherein a probability of sampling a line segment is proportional to a total length of all line segments in the Hough transform bin that contains the line segment.

26. The mobile device of claim 17, wherein the processor is adapted to use the plurality of line segments to detect the planar object by being adapted to:
generate a plurality of hypothesized objects in the image using the plurality of line segments; and
determine at least one hypothesized object that has the predefined geometric shape.

27. The mobile device of claim 26, wherein there are a plurality of hypothesized objects that have the predefined geometric shape, the processor being further adapted to select one of the plurality of hypothesized objects as the planar object automatically or by user input.

28. The mobile device of claim 17, wherein the predefined geometric shape is a convex quadrilateral.

29. The mobile device of claim 17, wherein the predefined geometric shape comprises a regular polygon.

30. The mobile device of claim 17, wherein the processor is adapted to determine the initial pose of the camera with respect to the planar object in the image based on the predefined geometric shape.

31. The mobile device of claim 17, wherein the processor is adapted to track the pose of the camera by being adapted to extract features within the planar object and use the extracted features in addition to the planar object with the edges of the planar object.

32. The mobile device of claim 17, wherein the processor is adapted to track the pose of the camera by being adapted to down sample the image and use patch based tracking on a coarse resolution level and use edge based tracking based on results of the patch based tracking on a fine resolution level.

33. A mobile device comprising:
means for capturing an image of a planar object with a camera, the planar object having a predefined geometric shape;
means for detecting edge pixels of the planar object in the image, wherein the means for detecting edge pixels calculates a gradient magnitude and a gradient orientation of each pixel in the image on a sparse grid and performs a non-maximum suppression by comparing the gradient magnitude of pixels on the sparse grid to gradient magnitudes of neighboring pixels along the gradient orientation and that are not on the sparse grid;
means for detecting a plurality of line segments from the edge pixels;
means for using the plurality of line segments to detect the planar object in the image based on the predefined geometric shape;
means for determining an initial pose of the camera using the planar object; and
means for tracking a pose of the camera with respect to the planar object in subsequently captured images using the initial pose and edges of the planar object.

34. The mobile device of claim 33, wherein the means for detecting the plurality of line segments selects two edge pixels with gradient orientations that are within a predefined tolerance from each other; finds pixels on a line between the two edge pixels that are edge pixels; and compares a percentage of edge pixels on the line between the two edge pixels to a threshold to determine if the two edge pixels are on a line segment.

35. The mobile device of claim 33, wherein the means for detecting the plurality of line segments selects two edge pixels with different gradient orientations; defines a junction at an intersection of hypothesized lines extending through the two edge pixels, wherein each hypothesized line extends in a direction orthogonal to a gradient orientation of one of the two edge pixels; finds pixels on the hypothesized lines between the two edge pixels that are edge pixels; and compares a percentage of edge pixels on the hypothesized lines between the two edge pixels to a threshold to determine if the two edge pixels and the junction are on line segments.

36. The mobile device of claim 33, wherein the means for using the plurality of line segments to detect the planar object places each of the plurality of line segments in a Hough transform bin based on gradient orientation and intercept; and samples the plurality of line segments to find line segments that satisfy a shape grammar for the predefined geometric shape, wherein a probability of sampling a line segment is proportional to a total length of all line segments in the Hough transform bin that contains the line segment.

37. The mobile device of claim 33, wherein the means for tracking the pose of the camera extracts features within the planar object and uses the extracted features in addition to the planar object with the edges of the planar object.

38. The mobile device of claim 33, wherein the means for tracking the pose of the camera down samples the image and uses patch based tracking on a coarse resolution level and uses edge based tracking based on results of the patch based tracking on a fine resolution level.

39. A non-transitory computer-readable medium including program code stored thereon, comprising:
  program code to detect edge pixels of a planar object in an image captured with a camera, the planar object having a predefined geometric shape, wherein the program code to detect edge pixels calculates a gradient magnitude and a gradient orientation of each pixel in the image on a sparse grid; and performs a non-maximum suppression by comparing the gradient magnitude of pixels on the sparse grid to gradient magnitudes of neighboring pixels along the gradient orientation and that are not on the sparse grid;
  program code to detect a plurality of line segments from the edge pixels;
  program code to use the plurality of line segments to detect the planar object in the image based on the predefined geometric shape;
  program code to determine an initial pose of the camera using the planar object; and
  program code to track a pose of the camera with respect to the planar object in subsequently captured images using the initial pose and edges of the planar object.

40. The non-transitory computer-readable medium of claim 39, wherein the program code to detect the plurality of line segments selects two edge pixels with gradient orientations that are within a predefined tolerance from each other; finds pixels on a line between the two edge pixels that are edge pixels; and compares a percentage of edge pixels on the line between the two edge pixels to a threshold to determine if the two edge pixels are on a line segment.

41. The non-transitory computer-readable medium of claim 39, wherein the program code to detect the plurality of line segments selects two edge pixels with different gradient orientations; defines a junction at an intersection of hypothesized lines extending through the two edge pixels, wherein each hypothesized line extends in a direction orthogonal to a gradient orientation of one of the two edge pixels; finds pixels on the hypothesized lines between the two edge pixels that are edge pixels; and compares a percentage of edge pixels on the hypothesized lines between the two edge pixels to a threshold to determine if the two edge pixels and the junction are on line segments.

42. The non-transitory computer-readable medium of claim 39, wherein the program code to use the plurality of line segments to detect the planar object places each of the plurality of line segments in a Hough transform bin based on gradient orientation and intercept; and samples the plurality of line segments to find line segments that satisfy a shape grammar for the predefined geometric shape, wherein a probability of sampling a line segment is proportional to a total length of all line segments in the Hough transform bin that contains the line segment.

43. The non-transitory computer-readable medium of claim 39, wherein the program code to track the pose of the camera extracts features within the planar object and uses the extracted features in addition to the planar object with the edges of the planar object.

44. The non-transitory computer-readable medium of claim 39, wherein the program code to track the pose of the camera down samples the image and uses patch based tracking on a coarse resolution level and uses edge based tracking based on results of the patch based tracking on a fine resolution level.

* * * * *